United States Patent
Umemoto et al.

(10) Patent No.: US 6,636,358 B2
(45) Date of Patent: Oct. 21, 2003

(54) OPTICAL FILM

(75) Inventors: Seiji Umemoto, Osaka (JP); Toshihiko Ariyoshi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/774,602

(22) Filed: Feb. 1, 2001

(65) Prior Publication Data

US 2001/0012158 A1 Aug. 9, 2001

(30) Foreign Application Priority Data

Feb. 2, 2000 (JP) .................................. P2000-025366

(51) Int. Cl.⁷ .............................. G02B 13/20; F21V 8/00
(52) U.S. Cl. ......................... 359/599; 359/831; 362/31
(58) Field of Search ................................ 359/599, 707; 349/61–68, 113; 362/26–31; 385/116, 146

(56) References Cited

U.S. PATENT DOCUMENTS

| | | |
|---|---|---|
| 5,183,597 A | 2/1993 | Lu |
| 5,341,231 A | 8/1994 | Yamamoto et al. |
| 5,390,276 A | 2/1995 | Tai et al. .................... 385/146 |
| 5,485,291 A | 1/1996 | Qiao et al. |
| 5,584,556 A | 12/1996 | Yokoyama et al. ........... 362/32 |
| 5,671,994 A | 9/1997 | Tai et al. |
| 5,712,694 A | 1/1998 | Taira et al. |
| 5,727,107 A | 3/1998 | Umemoto et al. .......... 385/116 |
| 5,808,713 A | 9/1998 | Broer et al. ................. 349/98 |
| 5,897,184 A | 4/1999 | Eichenlaub et al. |
| 5,945,209 A * | 8/1999 | Okazaki et al. .......... 428/304.4 |
| 5,961,198 A | 10/1999 | Hira et al. |
| 6,044,196 A | 3/2000 | Winston et al. |
| 6,060,183 A | 5/2000 | Higashi et al. |
| 6,147,732 A * | 11/2000 | Aoyama et al. ............. 349/112 |
| 6,196,692 B1 * | 3/2001 | Umemoto et al. ............. 362/31 |
| 6,236,439 B1 | 5/2001 | Saiki et al. |
| 6,322,236 B1 | 11/2001 | Campbell et al. |
| 6,369,950 B1 | 4/2002 | Umemoto .................... 359/628 |
| 6,384,881 B1 | 5/2002 | Arai et al. |
| 2001/0009474 A1 | 7/2001 | Umemoto et al. |
| 2001/0010630 A1 | 8/2001 | Umemoto et al. |
| 2001/0011779 A1 | 8/2001 | Stover |
| 2001/0012159 A1 | 8/2001 | Umemoto et al. ........... 359/599 |
| 2001/0053029 A1 | 12/2001 | Umemoto et al. |

FOREIGN PATENT DOCUMENTS

| | | | |
|---|---|---|---|
| EP | 0 867 747 A2 | 9/1998 | |
| JP | 5-158033 | 6/1993 | |
| JP | 09-297222 | 11/1997 | |
| JP | 10-106328 | 4/1998 | |
| JP | 11-142618 * | 5/1999 | ................. 359/599 |
| JP | 2000-147499 | 5/2000 | |
| WO | WO 97/01610 | 1/1997 | |
| WO | WO 97/30373 | 8/1997 | |
| WO | WO 97/47467 | 12/1997 | |

* cited by examiner

Primary Examiner—Thong Nguyen
(74) Attorney, Agent, or Firm—Sughrue Mion, PLLC

(57) ABSTRACT

An optical film includes a transparent film having provided on one side thereof an adhesive layer, a layer which includes a plurality of groove structures, each structure having optical-path changing slopes oriented substantially toward certain directions at an angle of 35 to 48 degrees relative to the transparent film, and which is laid on the other side of the transparent film, a transparent cover film for covering the surface of the layer in which the groove structures are formed, and at least an anti-reflection layer and an anti-moisture layer laid on an exterior side of the cover film.

9 Claims, 1 Drawing Sheet

OPTICAL FILM

BACKGROUND OF THE INVENTION

1. Field of the Invention

The present invention relates to an optical film having a superior anti-moisture characteristic and which efficiently changes the optical path of light having entered from a sidewise direction to a viewing direction and which enables formation of a slim, lightweight, bright, and easily-viewable liquid-crystal display device.

The present application is based on Japanese Patent Application No. 2000-25366, which is incorporated herein by reference.

2. Description of the Related Art

Demand exists for a slimmer and much lighter-weight reflection-type liquid-crystal display device for use in miniaturizing a portable personal computer or a cellular phone. Against this backdrop, a related-art reflection-type liquid-crystal device provided with a side-light-type light pipe and a front light involves use of a light pipe of 1 mm thickness or more required for realizing optical transmission. Hence, difficulty is encountered in miniaturizing the related-art liquid-crystal device of this type. Even in a case where a dual-purpose illumination-and-external-light liquid crystal display device with backlighting is embodied through use of a half-transmission type reflector, use of a sidelight light pipe is required. The thickness of the sidelight light pipe hinders miniaturization of the liquid-crystal device, as in the case of the sidelight-type liquid-crystal display device.

In the case of the liquid-crystal display device with backlighting using a half-transmission type reflector, addition of the half-transmission type reflector results in an increase in the weight of the liquid-crystal display device. As a result of light being separated into transmitted light and reflected light by means of the half-transmission type reflector, the view in an illumination mode becomes dark. Further, the view in an external-light mode also becomes dark. The brightness of the view falls short of the brightness of view obtained by a reflection layer of high reflectivity specifically designed for only reflection purpose.

SUMMARY OF THE INVENTION

The present invention is aimed at developing an optical film which efficiently changes the optical path of light having entered from a sidewise direction to a viewing direction and which enables formation of a slim, lightweight, bright, and easily-viewable liquid-crystal display device.

The present invention provides an optical film comprising:

a transparent film having an adhesive layer provided on one side thereof;

a layer which includes a plurality of groove structures, each structure having optical-path changing slopes oriented substantially toward certain directions at an angle of 35 to 48 degrees relative to the transparent film, and which is laid on the other side of the transparent film;

a transparent cover film for covering the surface of the layer in which the groove structures are formed; and at least an anti-reflection layer and an anti-moisture layer laid on an exterior side of the cover film.

If the optical film according to the present invention is placed on a view surface of a liquid-crystal display panel having an illumination device disposed on the side thereof, the optical path of the light having entered from the side or the optical path of transmitted light of the incident light is efficiently changed to the viewing direction of the liquid-crystal display pane by way of the optical-path changing slopes formed in the optical film, thus effectively utilizing the light for liquid-crystal display. Thus, there can be formed a slim and lightweight liquid-crystal display device providing good display quality. By means of forming a smooth plane between the optical-path changing slopes, external light can be efficiently introduced into the liquid-crystal display panel. The incident light is subjected to reflection by way of a reflection layer, as is the light whose optical path has been changed. Thus, the incident light can be utilized for liquid-crystal display. In addition to an illumination mode, an external-light mode is also available on the liquid-crystal display panel. Consequently, there can be formed a slim, lightweight, and bright dual-purpose illumination-and-external-light liquid-crystal display device which provides superior display quality.

The above-described advantage is primarily ascribable to an optical film which controls an optical path by means of slope reflection. The light having entered from the side or transmitted incident light is subjected to reflection by way of the optical-path changing slopes, whereby the optical path of the light can be changed with superior directivity. Accordingly, good view can be achieved in an illumination mode. Further, a flat plane can be readily formed between the optical-path changing slopes. External light is caused to transmit through the flat lane, thus ensuring entrance of a sufficient amount of external light. Good view is achieved even in an external-light mode. Difficulty will be encountered in achieving such an advantage by means of a film of scattering and reflection type, such as a scattering sheet using rough surfaces. Unexamined Japanese Patent Publication No. Hei. 5- 158033 describes a reflection-type liquid-crystal display device, in which illumination light is caused to enter from the side surface of a liquid-crystal display panel, and the thus-entered light is subjected to total reflection by a view-side cell board. The thus-reflected light is subjected to scattering on a rough reflector, and the scattered light is utilized.

In this case, the light which can be utilized for display is light which is emanated from the panel after having been scattered and has not been subjected to total reflection. Scattered light usually exhibits a normal distribution showing a peak in the direction of regular reflection (the 20th Liquid-Crystal Forum Lecture Proceedings 3 G510, Tohoku University, UCHIDA Hitoshi). The display light is tilted sharply relative to the front direction (i.e., the vertical direction), and effective utilization of such light for display is difficult. Hence, dark display appears in the front direction. Even if the scattering characteristic of the rough reflector is made more intensive, the amount of light which is confined within the panel and cannot leave the panel is increased. Eventually, dark display occurs.

In contrast, the optical film according to the present invention—which controls an optical path by means of slope reflection—-primarily utilizes light appearing in the direction of regular reflection in which a peak appears, thus controlling an optical path of reflected light. Hence, directivity useful for display; particularly, directivity in the front direction, can be readily imparted to reflected light. Hence, bright display can be achieved even in a reflection mode. Further, the optical-path changing slopes are protected by a cover film, thus preventing groove structures from being clogged by soils. Soils can be readily removed by way of the soil-resistance layer, thus maintaining the optical-path changing function over a long period of time. Hence, the optical film can be utilized for a front-type liquid-crystal display device.

Features and advantages of the invention will be evident from the following detailed description of the preferred embodiments described in conjunction with the attached drawings.

DETAILED DESCRIPTION OF THE PREFERRED EMBODIMENTS

Figure 1A:
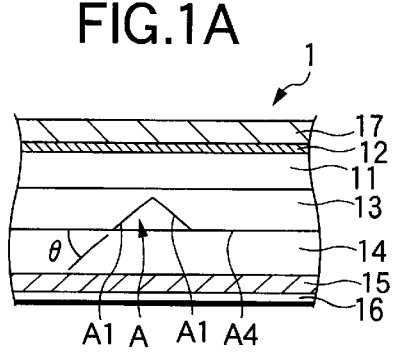
FIGS. 1A through 1C are descriptive side views of examples of optical films (including optical-path changing slopes)
Figure 1B:
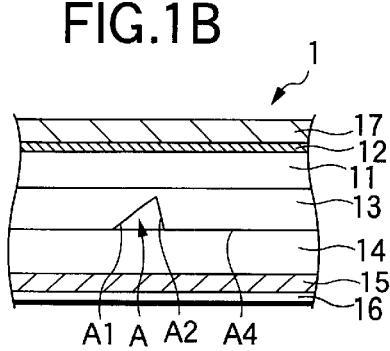
Figure 1C:
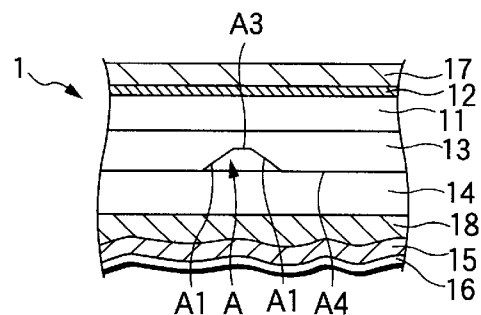

The present invention provides an optical film comprising:

a transparent film having provided on one side thereof an adhesive layer;

a layer which includes a plurality of groove structures, each structure having optical-path changing slopes oriented substantially toward certain directions at an angle of 35 to 48 degrees relative to the transparent film, and which is laid on the other side of the transparent film;

a transparent cover film for covering the surface of the layer in which the groove structures are formed; and at least an anti-reflection layer and an anti-moisture layer laid on an exterior-side of the cover. An example optical film is shown in FIGS. 1A through 1C. Reference numeral 1 designates an optical film; 11 designates a transparent film; 12 designates an adhesive layer; 13 designates a layer having a plurality of groove structures A having optical-path changing slopes A1; that is, a repetitive structure layer of optical-path changing means A (simply referred to as a "repetitive structure layer"); 14 designates a cover film; 15 designates an anti-reflection layer; 16 designates an anti-moisture layer; 17 designates a release liner; and 18 designates an antiglare layer. The repetitive structure may be formed integrally in the transparent film 11.

Figure 2:
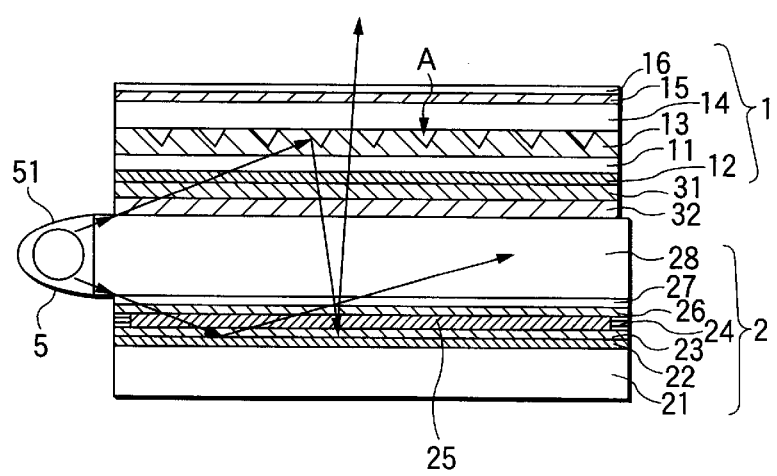
FIG. 2 is a descriptive cross-sectional view showing an example of reflection-type (dual-purpose illumination-and-external-light) liquid-crystal display device.

As shown in FIG. 2, an illumination device 5 is disposed on the side surface of a liquid-crystal display panel 2. The optical film 1 is placed on a view surface of the liquid-crystal display panel 2. The light having entered from the illumination device 5 in the sidewise direction or transmitted incident light is reflected in the direction designated by arrows by way of the optical-path changing slope A1. As a result, the optical path of the light is changed toward the non-slope surface of the transparent film 11; that is, a direction in which the liquid-crystal display panel 2 is to be viewed. The light is then caused to exit from a transparent film. The thus-outgoing light can be utilized as illumination light (display light) of the liquid-crystal display panel.

The transparent film 11 may be formed from appropriate material which exhibits transparency in accordance with the wavelength of light introduced into the optical film by way of the illumination device 5. For visible light, there may be employed materials such as acrylic resin or polycarbonate-based resin; cellulose-based resin or norbomane-based resin; polyester resin or polyether-sulphone-based resin; polyamide resin or polyimide resin; polyolefine-based resin or polyether-based resin; transparent resin typified by polyvinyl chloride or styrene-based resin; or acrylic hardening resin, urethane-based hardening resin, acrylic-urethane hardening resin, epoxy hardening resin, or silicon-based hardening resin, which can be polymerized by means of radiation such as heat, UV-rays, and electrons. More preferably, there may be employed material exhibiting little or no birefringence. There may be a case where internal stress may arise within the transparent film 11 by means of bonding operation. In terms of preventing occurrence of retardation, which would otherwise be caused by internal stress, material having low photoelasticity is preferably used.

In view of formation of a liquid-crystal display device which involves little display unevenness, as a result of suppressing luminance unevenness, and chromaticity unevenness, there is preferably used a transparent film involving a low degree of in-plane mean retardation, such as that mentioned previously; more preferably, a transparent film having retardation of 30 nm or less. So long as the transparent film 11 is formed from a film of low retardation, as illustrated in FIG. 2, when linearly-polarized light enters the optical film 1 by way of a polarizer 31, the polarized state of light can be sustained properly, thus preventing deterioration of display quality. In a case where the transparent film 11 is formed from a common polyester film, the film exhibits retardation of about 2,000 nm. When linearly-polarized light enters a film of high retardation, by way of a polarizer, light may assume rainbow colors under the influence of retardation, depending on an incident angle or a reflection angle. Alternatively, the polarized state of light may be changed, in which case transmission efficiency and output efficiency are deteriorated. Accordingly, luminance and chromaticity unevenness become likely to arise. In terms of prevention of display unevenness, in-plane mean retardation of a transparent film is preferably 20 nm or less; more preferably, 15 nm or less; and particularly preferably, 10 nm or less. Preferably, local variations in retardation are minimized.

In consideration of the fact that the angle at which transmitted light enters a transparent film is likely to exceed 45 degrees, light is susceptible to mean retardation of the transparent film in its thicknesswise direction, as in the case of in-plane mean retardation, as mentioned previously. In terms of prevention of display unevenness, mean retardation in a thicknesswise direction preferably assumes a value of 50 nm or less, more preferably a value of 30 nm or less, and particularly preferably a value of 20 nm or less. A transparent film of low retardation may be formed by means of removing internal optical distortion of the film through annealing of an existing film.

A preferable method of forming a transparent film is a method of forming a film of low retardation by means of the casting technique. The only requirements are that retardation requirements for a transparent film be satisfied within a range in which the film is to be used for effecting display on an optical film. Hence, there is no necessity for satisfying retardation requirements over the entire optical film. Preferably, the retardation is based on light in a visible range; particularly, light having a wavelength of 550 nm. Preferably, in order to control retardation, the transparent film 11 is formed as a multilayer member of two or more layers of homogeneous or heterogeneous resin. As illustrated, there is no necessity for forming a transparent film as an integral single-layer object consisting of one type of material. The thickness of a transparent film may be determined in view of requirements. However, in terms of demand for a thinner film, the thickness of a transparent film is 300 µm or less, preferably 5 to 200 µm, and more preferably 10 to 100 µm.

From the viewpoint of achieving the aforementioned objectives, slopes A1 for changing to certain directions the optical path of the light that has entered the film from a sidewise direction or the optical path of transmitted incident light are formed on one side of the transparent film 11, as shown in FIGS. 1A through 1C. In this case, in order to obtain illumination light exhibiting superior directivity toward the front direction by means of changing of the optical path of light, the transparent film 11 has a repetitive structure of optical-path changing means A, as shown in FIGS. 1A through 1C. More specifically, the repetitive structure comprises groove structures (recesses), wherein each groove structure has optical-path changing slopes A1 oriented substantially toward certain directions and inclined at an angle θ0 ranging from 35° through 48° relative to the film surface A4.

An example of the foregoing optical-path changing means A is shown in FIGS. 1A through 1C. FIGS. 1A and 1B show optical-path changing means A having substantially-triangular cross sections, and FIG. 1C shows optical-path changing means A of substantially-quadrangular cross section. More specifically, FIG. 1A shows optical-path changing means A having two optical-path changing slopes A1 which, in combination with the corresponding film surface, are arranged into an isosceles triangle. FIG. 1B shows optical-path changing means A having an optical-path changing slope A1 and a steep slope A2 which is greater in angle of tilt than the optical-path changing slope A1. FIG. 1C shows optical-path changing means A comprising two optical-path changing slopes A1 and a flat plane A3.

As mentioned in the example, the optical-path changing means can be formed in a recess consisting of equilateral surfaces or slopes of equal tilt angle, a recess consisting of an optical-path changing slope and a steep or gentle slope, and a recess consisting of slopes of different tilt angles. Slope geometries can be determined in accordance with the number and position of sidewise directions, as required. Hence, there may be formed a repetitive structure in which a plurality of optical-path changing means A, each means consisting of a shorter optical-path changing slope A1 and a long gentle slope; more particularly, a slope of tilt angle of 10° or less relative to a film surface, are provided continuously and adjacently.

From the viewpoint of achieving a certain characteristic, such as directivity toward the front direction, the substantially-certain direction toward which the optical-path changing slope A1 is oriented faces a sidewise direction from which light is to enter. Accordingly, when light is introduced into the optical film from two or more sidewise directions, an optical film has the optical-path changing slopes A1 corresponding to the number and positions of the sidewise directions.

In a case where light enters an optical film from two mutually-opposing side surfaces of the optical film, there is preferably employed the optical film 1 comprising the optical-path changing means A shown in FIG. 1A or the optical film 1 comprising the optical-path changing means A shown in FIG. 1C. The optical-path changing means A shown in FIG. 1A consists of two optical-path changing slopes A1 arranged so as to assume, in combination with the corresponding film surface, a substantially-isosceles-triangle cross section. In contrast, the optical-path changing means A shown in FIG. 1C consists of two optical-path changing slopes A1 arranged so as to assume a quadrangular or substantially trapezoidal cross section. The ridge lines of the optical-path changing slopes A1 are parallel with the sidewise direction. Preferably, the optical film 1 comprises two or more optical-path changing slopes A1 such that, when one of the slopes is taken as a reference, the remaining slope(s) are oriented in the reverse direction opposite the reference, i.e., positive and negative slopes. The optical-path changing slopes A1 may be formed such that the ridge lines of the slopes A1 extend in the directions along two adjacent surfaces of the optical film including the longitudinal and lateral directions of the optical film or directions along three or more side surfaces of the optical film including the longitudinal, lateral, and oblique directions of the optical film.

As mentioned previously, the optical-path changing slope A1 plays a role of reflecting, among light rays entering from sidewise directions or transmitted incident light, those light entering the slope A1, thus changing the optical path of the light entering the slope A1. In this case, as shown in FIG. 1A, the optical-path changing slope A1 is tilted at an angle θ of 35° to 48° relative to the surface of the optical film 1. As a result, the optical path of the light that has entered from a sidewise direction or the optical path of transmitted incident light is changed at substantially right angles to the surface of the optical film, whereby there can be efficiently obtained illumination light that is well directed toward the front.

At an angle of tilt of smaller than 35°, the optical path of the reflected light greatly diverts at an angle of 30° or more from the front direction. Accordingly, effective utilization of reflected light becomes difficult, and brightness in the front direction is deteriorated. In contrast, at an angle of tilt of greater than 48°, requirements for subjecting, to total reflection, the light having entered from sidewise directions or transmitted incident light are not satisfied. Accordingly, the amount of light which leaks from the optical-path changing slope increases, thus deteriorating efficient utilization of the light that has entered the optical film from sidewise directions. In view of change of an optical path toward the front direction with good directivity and suppression of leak light, the angle of tilt θ of the optical-path changing slope A1 preferably ranges from 38° to 45°, more preferably 40° to 44°, in consideration of total reflection requirements for transmitted light in accordance with refraction based on Snell's law.

The optical-path changing means A having the optical-path changing slopes A1 is formed as a repetitive structure for the purpose of rendering the optical film thinner. The light that has entered the optical film from a sidewise direction is reflected to a rearward direction, to thereby efficiently transmit the incident light toward the other sidewise direction. As a result, the entire surface of the optical film is illuminated immediately and uniformly. To these ends, the optical-path changing means A is preferably constructed so as to comprise a gentle slope inclined at 5° or less, preferably 4° or less, and more preferably 3° or less relative to the surface of the optical film. Alternatively, the optical-path changing means A preferably includes surface A3 having an angle of tilt of substantially 0° or a flat plane consisting of film surface A4. In the case of the optical-path changing means A including the steep slope A2 shown in FIG. 1B, the angle of the steep slope is preferably set to 35° or more, preferably an angle of 50° or more, and more preferably an angle of 60° or more, thereby increasing the width of the film surface A4.

When the optical film 1 is placed on the front side of the reflection-type liquid-crystal display panel 2, as shown in FIG. 2, or when the optical film 1 is placed on the rear side of the display panel 2 while a reflection layer is provided on the reverse side of the optical film, the flat plane can act as a transmission section for permitting transmission of display light during an illumination mode, or as both an entrance section for external light and a transmission section for permitting transmission of the external light which has been reflected by a reflection layer 22. As a result, the illumination device enables display in an illumination mode and an external-light mode using external light. Thus, a dual-purpose illumination-and-external-light liquid-crystal display device can be formed.

In order to realize a bright display, the areas or the widths on one surface of the optical film occupied by gentle slopes inclined at an angle of less than five degrees relative to the surface of the optical film or by the flat planes A3 and A4 are preferably set so as to become five times or more, preferably eight times or more, particularly preferably ten times or more, the areas occupied by the slopes A1 and A2 inclined at an angle of 35 degrees or more. This is intended for improving the efficiency of attaining incidence of external light and the efficiency of transmission of the light reflected from the reflection layer.

In a case where the ridge lines of the optical-path changing means A are arranged parallel to or inclined with respect to the sidewise direction in which light enters, the optical-path changing means A may be formed continuously across the transparent film or discontinuously and intermittently across the transparent film. In a case where the optical-path changing means A is formed discontinuously, the groove structures are formed such that the lengths of the groove structures in the sidewise direction become five times or more the depths of the groove structures, in view of efficiency of attaining incidence of transmitted light and efficiency of changing of an optical path. The lengths of the groove structures preferably assume a value of 500 $\mu$m or less, more preferably a value of 10 $\mu$m to 480 $\mu$m, and particularly preferably a value of 50 $\mu$m to 450 $\mu$m, in view of uniform illumination of the optical film.

A slope constituting the optical-path changing means A may be formed from a required plane geometry, such as a linear plane, a refraction plane, or a curved plane. No particular limitations are imposed on the cross-sectional geometry of the optical-path changing means A or a pitch at which the optical-path changing slope A1 is to be repeated. The optical-path changing slopes A1 determine the brightness of the liquid-crystal display during the illumination mode. Hence, the optical-path changing slopes A1 can be determined in accordance with the evenness of illumination on the optical film or evenness of illumination in the external-light mode of the dual-purpose illumination-and-external-light liquid-crystal display device, as required. The amount of light whose optical paths have been changed can be controlled in accordance with a distribution density of the optical-path changing slopes.

Hence, the slopes A1 and A2 may be constant over the entire surface of the transparent sheet. Alternatively, in order to make uniform the illumination of the optical film so as to compensate for absorption loss or attenuation of transmitted light induced by previous change of the optical path of the transmitted light, the pitch of the optical-path changing means A may be made larger with increased distance from the side surface by way of which light enters the optical film. Alternatively, the optical-path changing means A may be provided at constant pitches.

Pitches of the optical-path changing means A may be made gradually narrower with increasing distance from the side by way of which light enters the optical film. Alternatively, the optical-path changing means A may be formed at random pitches, thereby rendering illumination on the optical film uniform. Random pitches are also preferable in terms of prevention of occurrence of moire, which would otherwise be caused by interference between pixels. Hence, the optical-path changing means A may be formed in combination with groove structures which are formed at different pitches and into different shapes.

When an overlap exists between the optical-path changing slope A1 and a pixel of the liquid-crystal display panel, the optical film transmits the display light insufficiently, which may in turn result in an unnatural display. In order to prevent such an unnatural display, minimizing the area of an overlap between the optical-path changing slopes A1 and pixels and ensuring a sufficient light transmissivity of the flat planes A3 and A4 are desirable. In this respect, the optical-path changing slope A1 is formed to an area of 40 $\mu$m or less, preferably an area of 3 to 20 $\mu$m, and more preferably an area of 5 to 15 $\mu$m with respect to the width of projection on the film surface, in consideration of the fact that pixels are usually formed on the liquid-crystal display panel at a pitch of 100 to 300 $\mu$m. Since a coherent length of a fluorescent tube is usually set to a value of 20 $\mu$m or thereabouts, the width of projection is preferable for preventing deterioration of display quality, which would otherwise be caused by diffraction.

In this respect, the interval between the optical-path changing slopes A1 should be wide. However, as mentioned previously, the optical-path changing slope is substantially a functional block for generating illumination light by means of changing the optical path of the light that has entered the optical path from the sidewise direction. Hence, if the interval between the optical-path changing slopes A1 is excessively wide, illumination during an illumination mode becomes less intensive, thus resulting in an unnatural display. Preferably, the pitch at which the optical-path changing slopes A1 are to be repeated is set to a value of 5 mm or less, preferably a value of 20 $\mu$m to 3 mm, and more preferably a value of 50 $\mu$m to 2 mm.

There may arise a case where the repetitive structure of optical-path changing means interferes with pixels of the liquid-crystal display panel, thus inducing moire. Moire can be prevented by means of controlling a pitch of the repetitive structure. However, as mentioned above, a preferable range exists for the pitch of the repetitive structure. Hence, there is a necessity of determining a solution for moire which can arise within the range of pitch. In the present invention, the ridge lines of the groove structures are set so as to become inclined against the sidewise direction such that groove structures can be arranged so as to cross pixels, thereby preventing occurrence of moire.

If the angle of tilt of the ridge line relative to the sidewise direction is excessively large, the light which has been reflected by the optical-path changing slope A1 is susceptible to deflection. As a result, the direction in which the optical path of the light is to be changed is deflected, which is likely to deteriorate display quality. For this reason, the ridge lines are inclined with respect to the sidewise direction at an angle of ±30° or less, preferably an angle of ±25°, and more preferably an angle of ±20°. Symbol ± designates the directions in which the ridge lines are to be inclined with reference to the sidewise direction. When no moire arises, because of low resolution of a liquid-crystal display panel, or when moire is negligible, the ridge lines is preferably made parallel with the sidewise direction.

The transparent film having optical-path changing means can be formed by any of the following methods, as required.

One method is to press, for example, thermoplastic resin, into a heated metal mold of a predetermined shape, thus transferring the shape to the resin. Another method is to mold thermally-fused thermoplastic resin, or resin that has been fluidized by means of heat or a solvent, into a metal mold capable of molding the resin into a predetermined shape. Yet another method is to polymerize liquid resin—which can be polymerized by means of radiation such as heat, UV-rays, or electrons—by filling or drawing the resin into a mold capable of forming the resin into a predetermined shape.

An example preferable method for forming a transparent film having optical-path changing means is embodied by means of a method comprising the steps of:

coating one surface of a transparent film with hardening resin which can be polymerized by means of UV rays or radiation;

bringing the thus-coated layer into intimate contact with a surface of a metal mold having predetermined groove structures formed therein;

exposing the coated layer remaining in contact with the metal mold to UV rays or radiation, thus hardening the resin; and exfoliating the transparent film from the metal mold. Thus, repetitive groove structures having optical-path changing slopes formed therein are formed in one surface of the transparent film, by way of a metal mold of predetermined groove structures.

As mentioned above, the transparent film having optical-path changing means may be formed integrally while having optical-path changing means. Alternatively, as illustrated, the transparent film can be formed, by means of affixing the layer 13 having. optical-path changing means formed therein to one surface of the transparent film 11. In the latter case, if a great difference arises between the refractive index of the layer 13 and that of the transparent film 11, output efficiency may be greatly deteriorated for reasons of boundary reflection. In order to prevent such deterioration of output efficiency, the difference between the refractive index of the transparent layer and that of the transparent film 11 is preferably minimized.

More preferably, the difference in refractive index falls within a value of 0.10 or less, particularly preferably a value of 0.05 or less. In this case, in terms of output efficiency, the refractive index of the layer 13 having optical-path changing means formed therein is made greater than that of the transparent film. The layer 13 may be formed from appropriate material which exhibits transparency in accordance with the wavelength of light to be introduced into the optical film by way of the illumination device.

As described in connection with the example shown in FIG. 1, the optical film has the adhesive layer 12 attached to the surface of the transparent film 11 having no groove structures A formed therein. The adhesive layer 12 is to be used for adhering the optical film to a support member such as a liquid-crystal display panel. Bonding of the optical film to a support member by way of an adhesive layer is intended for improving the efficiency of reflection of light from the optical-path changing slopes A1 of the optical-path conversion means A, and, by extension, for improving the brightness of the liquid-display panel by means of effective utilization of the light having entered from a sidewise direction.

During formation of the adhesive layer 12, there may be employed an adhesive containing, as base polymer, one selected from the group consisting of rubber-based polymer, acrylic polymer, vinylalkylether-based polymer, silicon-based polymer, polyester-based polymer, polyurethane-based polymer, polyether-based polymer, polyamide-based polymer, and styrene-based polymer. Preferably, there is used an adhesive having superior transparency, weather-resistant, and heat-resistant characteristics, such as an acrylic adhesive containing, as base polymer, polymer primarily consisting of alkylester-acrylate or alkylester-methacrylate.

The present invention prevents confinement of light within an optical film, which would otherwise be caused by boundary reflection due to the difference of refractive index between layers of the optical film. In order to reduce the amount of light which cannot leave the optical film and becomes a loss, there is preferably employed an adhesive layer which differs in refractive index from the transparent film by a value of 0.12 or less, preferably a value of 0.10 or less, and particularly preferably a value of 0.05 or less. Further, the adhesive layer may be formed as optical diffusion type by means of comprising one type or two or more types of inorganic conductive/non-conductive particles of: for example, silica, alumina, titania, zirconia, oxidized tin, oxidized indium, oxidized cadmium, and antimony oxide; or organic particles such as cross-linked polymer or non-cross-linked polymer.

Until the adhesive layer is used for practice, the release liner 17 is temporarily adhered to the adhesive layer 12 for preventing extraneous matter from adhering the adhesive layer 12, as shown in FIGS. 1A through 1C. For the same reasons as those mentioned previously, the adhesive layer preferably differs in refractive index from a support member, such as the liquid-crystal display panel, by a value of 0.15 or less, preferably a value of 0.10 or less, and particularly preferably a value of 0.05 or less.

In the optical film, the surface 13 of the transparent film 11 having groove structures formed therein is coated with the cover film 14 for protecting the optical-path changing slopes, particularly, for protecting the optical-path changing slopes from soil, as illustrated. If the groove structures are filled with soils, the optical-path conversion function of the optical film is deteriorated. Further, when soils are cleaned off from the transparent film 11, the groove structures are likely to be filled with soils. The cover film 14 may be formed from appropriate material which exhibits transparency in accordance with the wavelength of light entering by way of the illumination device, as in the case of the transparent film 11.

As illustrated, at least the anti-reflection layer 15 and the soil-resistant layer 16 are provided on the outside of the cover film 14. The anti-reflection layer 15 is provided for preventing surface reflection of external light which would hinder the view. The anti-reflection layer 15 can be formed by means of an appropriate method:

for example, a method of forming a coherent evaporation film, such as an evaporation dielectric multilayer film, or a method of forming a low-refractive-index film using an appropriate coating method including a dipping method or a spraying method.

The soil-resistant layer is intended for protecting the anti-reflection layer, by means of rendering the optical film less susceptible to contamination such as fingerprints or rendering cleaning of contaminants easy. As illustrated, the anti-moisture layer 16 is usually placed on the final surface of the optical film. The anti-moisture layer can also be formed, as a coating film, from material of small surface energy, such as fluorine-contained resin, as required.

Problems stemming from contamination are not solved by means of directly placing an anti-reflection layer in the groove structures. If the anti-reflection layer or the anti-moisture layer is directly formed in the groove structures by means of coating, the anti-reflection layer or the anti-moisture layer may be accumulated in recesses of the groove structures, thus deforming the groove structures. Resultantly, the optical-path changing function is likely to be blocked. However, in the present invention, the groove structures are coated with the cover film, thus preventing occurrence of the above problems.

As illustrated in FIG. 1C, the anti-glare (non-glare) layer 18 may be provided on the exterior surface of the cover film 14, as required. The non-glare layer 18 is intended for preventing hindrance of the view, which would otherwise be caused by scattering and reflection of external light. The view can be effectively improved by means of combination of the non-glare layer 18 with the anti-reflection layer 14. The non-glare layer 18 can be formed as a resin layer whose surface is formed into a minute prismatic structure, as required, by means of any of various methods: for example, a roughening method, such as a sand blasting method, an embossing method, or a blending method using transparent particles of silica.

The anti-reflection layer, the anti-moisture layer, and the non-glare layer may be lately attached to the cover film adhering to the surface of the transparent film having the groove structures formed therein. Alternatively, the anti-reflection layer, the anti-moisture layer, and the non-glare layer may be provided on the cover film beforehand. The cover film may be bonded to the surface of the transparent film having the groove structures formed therein. In a case where the non-glare layer 18 is attached to the cover film as shown in FIG. 1C, the non-glare layer 18 is provided inside the anti-reflection layer 15 in terms of an improvement in visibility. In this case, the non-glare layer is formed from resin which is harder than a cover film, such as urethane-acrylic UV-hardening-type resin, thereby imparting a hard-coating characteristic to the optical film. Further, the bonding strength of the anti-reflection layer can be improved. So long as the non-glare layer 18 is formed from high-refractive-index resin or preferably resin having a refractive index of 1.55 or more, the anti-reflection effect of the anti-reflection layer 15 can be improved further.

The optical film according to the present invention changes the optical path of the light having entered from an illumination device disposed in a sidewise direction or the optical path of transmitted incident light to a vertical direction favorable to viewing, by way of optical-path changing slopes. Thus, the optical film enables efficient utilization of light and permits passage of external light. As illustrated in FIG. 2, the illumination device 5 is disposed on one or two or more sides surfaces of the liquid-crystal display panel 2 as well as on the front-side or back-side of the same. Thus, the present invention enables formation of various devices, such as a dual-purpose illumination-and-external-light liquid-crystal display device which is bright, easy to view, permeable, and exhibits a superior low-power-consumption characteristic.

The example shown in FIG. 2 illustrates a front-type liquid-crystal display device. In this device, the majority of the light having entered from the illumination device in a sidewise direction is transmitted toward a rear direction by means of reflection determined by the law of refraction, by way of a lower cell board 21 and an upper cell board 28, and in accordance with the proportion of thicknesses of respective layers of the liquid-crystal display panel. As a result, the light having entered the optical-path changing slopes A1 of the optical film 1 provided on the view side thereof is efficiently subjected to optical-path changing and is oriented toward the rear direction with respect to the viewing direction. Further, the remaining light rays are transmitted toward the rear direction by means of total reflection, and the thus-reflected light rays enter the optical-path changing slopes A1 disposed in the rear direction. Here, the light rays are efficiently subjected to optical-path changing and oriented toward the rear direction with reference to the viewing direction. The light is reflected by the reflection layer 22 provided in the liquid-crystal cell, and the thus-reflected light exits from the flat plane A4 of the optical film, thus embodying a bright display.

The liquid-crystal display panel 2 is of transmission type or reflection type and has at least a liquid-crystal cell. As illustrated, the liquid-crystal display panel 2 has at least a liquid-crystal cell which is formed by means of sealing liquid crystal 25 between the cell boards 21 and 28 by way of a sealant 24. The light having entered the liquid-crystal display panel 2 by way of the optical film 1 is subjected to control by means of the liquid crystal 25, and the resultant light exits from the other side of the optical film as display light. Alternatively, the light having subjected to control can exit from the entrance side of the optical film 1 after having been reflected by the reflection layer. Anyway, no particular limitation is imposed on the type of the liquid-crystal display panel 2.

Specific examples of liquid-crystal cell include TN liquid-crystal cells, STN liquid-crystal cells, IPS liquid-crystal cells, HAN liquid-crystal cells, twisted or non-twisted cells such as OCB liquid-crystal cells or VA liquid-crystal cells, guest-host liquid-crystal cells, ferroelectric liquid-crystal cells, and light-scattering-type liquid-crystal cells. Further, a method of driving liquid crystal may also be an appropriate method: for example, the active matrix method or the passive matrix method. Liquid crystal is usually activated by means of a transparent electrode 27 or a reflection-type electrode 22 interposed between the pair of cell boards (21 and 28), as illustrated in FIG. 2.

An appropriate board, such as a glass board or a resin board, can be used as the cell board. In terms of display quality, a board facing the view side is preferably made of optically-isotropic material. From the viewpoint of improving brightness or display quality, a board to be disposed on the view side of the liquid-crystal display panel 2 preferably has superior transparency, such as a no-alkali glass plate to be placed on a blue glass plate. In terms of a light-weight characteristic, a resin board is preferable. No limitation is imposed on the thickness of the cell board. The thickness of the cell board can be determined in accordance with the strength at which liquid crystal is to be sealed into the liquid crystal display panel, as required. The thickness of the cell board usually assumes a value of 10 $\mu$m to 5 mm, preferably a value of 50 $\mu$m to 2 mm, and more preferably a value of 100 $\mu$m to 1 mm, in terms of a balance between light transmission efficiency, compactness, and light-weight.

During formation of a liquid-crystal cell, one appropriate function layer or two or more appropriate function layers, such as an oriented film made of a rubbed film for orienting liquid crystal or a color filter for color display purpose, may be provided, as required. As illustrated, an oriented film 23 is usually formed on the electrode 22, and an oriented film 26 is usually formed on the electrode 27. A non-illustrated color filter is usually provided between the cell board 21 and the electrode 22 or between the cell board 28 and the electrode 27.

In a case where the reflection-type liquid-crystal display device is manufactured, a reflection layer is provided in the display device. In this case, the reflection layer may be provided in a liquid-crystal cell, as is the electrode 22 shown in FIG. 2. Alternatively, the reflection layer may be provided outside the cell board 21 in the rear direction with respect to the viewing direction. The reflection layer can be formed from a white sheet, as required, in the same manner as in the background art. For example, the reflection layer is preferably embodied by a coated layer formed by means of impregnating binder resin with high-refractive-index metal, such as aluminum, silver, gold, copper, or chromium, or with metal-alloy powder of such metal; by a layer to which the metal or a dielectric multilayer film is added by means of an appropriate thin-film formation method, such as the vacuum-deposition method or the sputtering method; by a reflection sheet made supporting the coated layer or the layer formed by thin-film formation method on a film-made board; or a high-refractive-index reflection layer.

As in the case of the liquid-crystal cell shown in FIG. 2, the liquid-crystal panel 2 may be formed by means of adding one or more appropriate optical layers, such as a polarizer 31, a retarder 32, and a light-scattering layer, to the liquid crystal cell. The polarizer 31 is intended for realizing a display utilizing linearly-polarized light. The retarder 32 is intended for improving display quality by means of compensating for retardation due to the double-refraction of liquid crystal. The light-scattering layer is intended for enlarging a display range by means of scattering display light, averaging brightness by means of leveling bright-line emission by way of slopes of the optical film, and increasing the amount of light entering the optical film by means of scattering the light having been transmitted through the liquid-crystal display panel.

Any polarizer may be used as the polarizer set forth, and no particular limitation is imposed on the type of polarizer. In order to achieve a high contrast ratio by means of entrance of linearly-polarized intensive light, there may be preferably employed a polarizer having a high level of polarization: for example, an absorption type polarization film or a transparent protective layer imposed on either or both sides of the polarization film. The polarization film is formed by means of causing a hydrophilic macromolecular film, such as a polyvinyl-alcohol-based film, a partial formal-polyvinyl-alcohol-based film, and an ethylene-vinyl-acetate-copolymer-based partially-saponificated film, to adsorb iodine or a two-one substance such as a two-tone dye; and drawing the thus-adsorbed film.

During formation of the transparent protective film, a film having superior transparency, mechanical strength, thermal stability, and a moisture-shielding characteristic is preferably used. For example, the films which have been exemplified as preferable transparent films can be mentioned as example transparent protective films. The transparent protective layer can be adhered to the polarizer by means of a film-shaped adhesive or application of polymer liquid. The polarizer may be provided on only one side of the liquid-crystal cell, as illustrated, or on either side of the same.

As a retarder, there may be employed a birefringent film which is formed by means of drawing the polymer films exemplified as preferable transparent films by means of an appropriate method, such as the uniaxial or dual-axis orientation method; an oriented film of liquid appropriate crystal polymer such as nematic or discotic liquid-crystal polymer; or an oriented layer supported by a transparent base material, as required. Alternatively, there may be employed a thermal contraction film whose thicknesswise refractive index has been controlled by heating and contraction force. As illustrated, the retarder 32 for compensation purpose is usually interposed between the polarizer 31 disposed on the view side and/or the rear side and a liquid-crystal cell, as required. An appropriate retarder may be used as the retarder 32 in accordance with a wavelength. Further, a multilayer retarder consisting of two or more layers may also be used for controlling the optical characteristic of the retarder, such as retardation.

The light-scattering layer can be provided by means of an appropriate method, as in the case of the coating layer—which has minute groove structures formed on the surface thereof in the same manner as the non-glare layer 18—or a scattering sheet. Like the adhesive layer 12 having transparent particles blended therein, the light-scattering layer can be disposed so as to adhere the polarizer 31 to the retarder 32. As a result, the optical film can be made slimmer. The light-scattering layer can be provided outside the polarizer 31 (i.e., at a position closer to the view side rather than the polarizer 31). However, so long as the light-scattering layer is provided at a position closer to the liquid-crystal cell, external light enters the light-scattering layer after having been absorbed by the polarizer 31, thereby preventing reflection loss, which would otherwise be caused by a back-scattering phenomenon occurring when the light directly enters the light-scattering layer.

The illumination device disposed on the side surface of the liquid-crystal panel is intended for introducing light, which is to be utilized as illumination light for a liquid-crystal display device, from a sidewise direction of the liquid-crystal display panel. By combination of the illumination device with an optical film to be disposed on the back or front of the liquid-crystal display panel, the liquid-crystal display device can be miniaturized. An appropriate illumination device can be employed, as required. Preferably, there is employed an illumination device: for example, a linear light source such as a (cool or hot) cathode-ray tube; a point light source such as a light-emission diode; an array member in which point light sources are arranged linearly or in the form of a plane; or an illumination which is formed from a combination of a point light source and a linear light source and converts incident light originating from the point light source into a linear light source by means of a linear light pipe.

The illumination device can be disposed on one side surface or two or more side surfaces of the liquid-crystal display panel 2. When the illumination device is disposed on two or more side surfaces, the side surfaces may be a combination of mutually-opposing side surfaces or a combination of longitudinal and lateral side surfaces which cross each other. Moreover, the illumination device may be disposed on three or more side surfaces through use of these two types of combinations. Since a dual-purpose illumination-and-external-light liquid-crystal display device is viewed under external light in an external mode, there is no necessity for illumination. Hence, the illumination device is switchable between illumination and extinction. An arbitrary method may be employed for effecting such switching. Any one of related-art methods may be employed. Here, the illumination device may be of heterochromatic illumination type which can switch illumination colors or may be arranged so as to be able to effect heterochromatic illumination by way of illumination devices of different types.

If necessary, the illumination device 5 may be used in combination with appropriate auxiliary means, such as a reflector 51 enclosing the illumination device 5 for guiding divergent rays toward the liquid-crystal display panel 2, as illustrated. A resin sheet provided with a metal thin film of high reflectivity, a white sheet, or a metal foil may be used as the reflector 51. The reflector 51 can also be used as fixing means which encloses the illumination device 5 by means of the end of the reflector 51 being bonded to the cell board of the liquid-crystal display panel.

In the present invention, optical elements or components constituting the liquid-crystal display device, such as liquid-crystal cells, a polarizer, and a retarder, may be, wholly or in part, integrated, stacked, fixed, or arranged in a separable manner. In terms of prevention of deterioration of contrast, which would otherwise be caused by boundary reflection, the optical elements should preferably be fixed. An appropriate transparent adhesive, such as a tacky agent, can be used for hermetic fixing of optical elements. Alternatively, an adhesive layer having a scattering function may be embodied, by means of causing the transparent adhesive layer to contain transparent particles. The optical elements or components, particularly optical elements or components to be disposed on the view side of the display device, can be imparted with a UV-rays absorption function by means of processing the elements or components through use of UV absorbing agent: for example, ester-salicylate-based compounds, benzophenone-based compounds, benzotriazole-based compounds, cyanoacrylate-based compounds, and nickel-complex-salt-based compounds.

EXAMPLES

Example 1

Acrylic UV-rays hardening resin (Aronix UV-3701 produced by Toagosei Co., Ltd.) was filled into a metal mold which has been formed into a predetermined geometry beforehand, by means of dripping through use of a dropping pipet. Triacetil-cellulose (TAC) film (whose surface has been saponificated) of 80 thickness was placed standstill on the hardening resin. The film and the resin were brought into intimate contact with each other by means of a rubber roller, thereby eliminating excessive resin and air bubbles. The thus-contacted film and resin were set upon exposure to UV rays emitted from a metal halide lamp. The thus-set resin and film were removed from the metal mold and chopped into predetermined sizes. As a result, there was produced a transparent film: that is, a TAC film which has a refractive index of 1.49 and a repetitive structure of optical-path changing means of refractive index of 1.533 formed on one side surface thereof.

An anti-reflection layer formed from silicon dioxide and titanium dioxide was formed on one side of the TAC film of 40 μm thickness by means of vacuum deposition. An anti-moisture layer formed from fluoro-alkyl-silane was formed by means of coating. Further, the thus-formed cover film was bonded to the surface of the transparent film having the optical-path conversion means of groove structure formed therein, such that the anti-reflection layer was oriented outside, by means of an adhesive. An adhesive layer having a refractive index of 1.47 was bonded to the surface of the transparent film having no optical-path changing means formed therein, thus producing an optical film. The optical film has a width of 60 mm and a depth of 45 mm. Continuous grooves whose ridge lines are parallel with each other in the widthwise direction were formed at a pitch of 210 μm. The angle of tilt of the optical-path changing slope A1 was 42.5 to 43 degrees, and the optical-path changing slope A1 assume a width of 8 to 13 μm. The angle of tilt of the steep slope A2 was 67 to 67.5 degrees. The optical film has an optical-path changing means (see FIG. 1B). In this changing means, the area of the flat plane section (A4) is 9.8 times or more the total sum of the area on the film surface in which the optical-path changing means is projected and the area on the film surface in which the steep slope is projected.

A polarizer was adhered to the front and reverse side of a commercially-available TN-type liquid-crystal cell, and a sliver reflection plate of rough scattering type was adhered to the exterior of the polarizer provided on the rear side of the cell with respect to the viewing direction, thus forming a normally-white reflection-type TN liquid-crystal display panel. A cold cathode-ray tube was disposed on the side of the display panel, and a reflector made of a silver-deposited reflection sheet was disposed so as to surround the cathode-ray tube. Both ends of the cathode-ray tube were bonded to the upper and lower surfaces of the panel, whereby the cathode-ray tube was fixed. Subsequently, the optical film was adhered to the polarizer placed on the view side of the display panel by way of the adhesive layer, such that the optical-path changing slopes were oriented oppose in parallel the cathode-ray tube, thus completed a dual-purpose illumination-and-external-light liquid-crystal display device.

Example 2

An optical film was produced in the same manner as in Example 1, except the following processes. Namely, acrylic UV-rays hardening resin was filled into a metal mold which has been made rough by means of sand blasting, by means of dripping through use of a dropping pipet. A saponificated cover film was placed standstill on the hardening resin. The film and the resin were brought into intimate contact with each other by means of a rubber roller, thereby eliminating excessive resin and air bubbles. The thus-contacted film and resin were set upon exposure to UV rays emitted from a metal halide lamp. The thus-set resin and film were removed from the metal mold and chopped into predetermined sizes, thus producing a cover film having a non-glare surface. Subsequently, an anti-reflection layer and an anti-moisture layer were provided on the cover film. Through use of the optical film, there was produced a dual-purpose illumination-and-external-light liquid-crystal display device.

Comparative Example 1

A dual-purpose illumination-and-external-light liquid-crystal display device was produced in the same manner as in Example 1, except the following processes. Namely, an anti-reflection layer was directly formed on the surface of the transparent film having optical-path changing means formed therein, thus producing an optical film. The dual-purpose illumination-and-external-light liquid-crystal display device was produced through use of the thus-produced optical film.

Comparative Example 2

A dual-purpose illumination-and-external-light liquid-crystal display device was produced in the same manner as in Example 1, except the following processes. Namely, an anti-reflection layer was directly formed on the surface of the transparent film having optical-path changing means formed therein. An anti-moisture layer was applied over the anti-reflection layer, thus producing an optical film. The dual-purpose illumination-and-external-light liquid-crystal display device was produced through use of the thus-produced optical film.

Comparative Example 3

In the same manner as in Example 1, there was produced an optical film having the following specifications. Namely, the angle of tilt of the optical-path changing slope A1 was about 30 degrees, and the optical-path changing slope A1 assume a width of 7 to 11 μm. The angle of tilt of the steep slope A2 was about 70 degrees. The optical-path changing means were formed at a pitch of 210 μm.

The optical film has an optical-path changing means. In this changing means, the area of the flat plane section is 8.1 times or more the total sum of the area on the film surface in which the optical-path changing means is projected and the area on the film surface in which the steep slope is projected. A dual-purpose illumination-and-external-light liquid-crystal display device was produced through use of the thus-produced optical film.

Comparative Example 4

In the same manner as in Example 1, there was produced an optical film having the following specifications. Namely, the angle of tilt of the optical-path changing slope A1 was about 50 degrees, and the optical-path changing slope A1 assume a width of 10 to 16 μm. The angle of tilt of the steep slope A2 was about 70 degrees. The optical-path changing means were formed at a pitch of 210 μm.

The optical film has an optical-path changing means. In this changing means, the area of the flat plane section is 9.9 times or more the total sum of the area on the film surface in which the optical-path changing means is projected and the area on the film surface in which the steep slope is projected. A dual-purpose illumination-and-external-light liquid-crystal display device was produced through use of the thus-produced optical film.

Comparative Example 5

A dual-purpose illumination-and-external-light liquid-crystal display device was produced in the same manner as in Example 1, except the following processes. Namely, a cover film not having an anti-reflection layer and an anti-moisture layer was used to produce an optical film. The dual-purpose illumination-and-external-light liquid-crystal display device was produced through use of the thus-formed optical film.

Comparative Example 6

A dual-purpose illumination-and-external-light liquid-crystal display device was produced in the same manner as in Example 1, except the following processes. Namely, a cover film not having an anti-moisture layer was used to produce an optical film. The dual-purpose illumination-and-external-light liquid-crystal display device was produced through use of the thus-formed optical film.

Evaluation Tests

The brightness of a center on the front screen of each of the dual-purpose illumination-and-external-light liquid-crystal display devices manufactured in Examples and Comparative Examples was examined in a dark room through use of a luminance meter (Topcon, BM7), while the devices were held in an illumination mode in which the cold cathode-ray tube was illuminated without application of a voltage to the liquid-crystal display panel.

Results of the evaluation tests were provided in the following chart.

| Front Brightness ($cd/m^2$) | | | | | | | |
|---|---|---|---|---|---|---|---|
| Examples | | Comparative Examples | | | | | |
| 1 | 2 | 1 | 2 | 3 | 4 | 5 | 6 |
| 26 | 24 | 29 | 16 | 8 | 4 | 26 | 26 |

As can be seen from the chart, the front brightness achieved in Examples 1 and 2 and Comparative Examples 1, 5, and 6 is better than that achieved in Comparative Examples 2 and 4. In Comparative Examples 2 and 4, the amount of light outgoing at large angles is large, and hence the front brightness is not sufficient. Particularly, in Comparative Examples 3 and 4, light was emitted at large angles in directions opposite to the light source, thus having failed to contribute to displaying. In Comparative Example 2, the anti-moisture layer is filled into the groove structures, thereby deforming the groove structures. Hence, light exited at large angles. In Comparative Examples 3 and 4, the angles of tilt of the optical-path changing slopes are inappropriate. All examples, except Comparative Example 3, show good display quality while a voltage was applied to the liquid-crystal display panel in an illumination mode. In Comparative Example 3, the resultant view was hard to see.

In an external-light mode in which the cold cathode-ray tube was extinguished and external light was introduced into the display panel at an angle of 15 degrees from a ring-shaped illumination device, a voltage was applied to the liquid-crystal display panel. In this state, a bright and distortion-free image was displayed in Examples 1 and 2 and in Comparative Examples 1, 2, 4, and 6. However, the image produced in Comparative Example 3 was greatly distorted, and an image of ring-shaped illumination appeared in the image in Comparative Example 5.

As mentioned above, it is seen that a easily-viewable image was produced in Examples 1 and 2 and in Comparative Examples 1 and 6 even in both illumination and external-light modes. When the surfaces of the liquid-crystal display devices used in Examples 1and 2 and those used in Comparative Examples 1, 2, and 6 were stained with finger prints and an adhesive. Later, the stains and adhesive were removed by use of hexane-impregnated cotton wastes. In Examples 1 and 2, the finger prints and the adhesive could be removed easily. In both illumination and external-light modes, a clear image was restored. In contrast, in Comparative Example 6, the finger prints and the adhesive could not be removed completely. In Comparative Examples 1 and 2, the adhesive having deeply entered the groove structures was not removed sufficiently. Particularly in an illumination mode, the residual adhesive considerably deteriorated the efficiency of illumination, thus rendering a resultant image hardly visible. The resultant adhesive could have been removed considerably through use of an adhesive tape. However, removal of such an adhesive involved very complicated operations and consumption of much time. Hence, it is understood that the present invention has achieved a slimmer and lighter-weight liquid-crystal display device using a film while avoiding an increase in the weight and size of the liquid-crystal display device, formed a liquid-crystal display device of good display quality, and enabled easy removal of stains.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An optical film comprising:

a transparent film;

an adhesive layer provided on one side of said transparent film;

a layer including a plurality of groove structures, each structure having optical-path changing slopes oriented substantially toward certain directions at an angle of 35 to 48 degrees relative to the transparent film, and said layer being laid on the other side of said transparent film;

a transparent cover film for covering the surface of the layer in which the groove structures are formed; and at least an anti-reflection layer and an anti-moisture layer laid on an exterior side of the cover film;

wherein the transparent cover film covers the surface of the layer in which the groove structures are formed without directly covering surfaces of the grooves.

2. An optical film according to claim 1, wherein the optical-path changing slopes oriented substantially toward certain directions are made up of two or more planes such that, if one of the planes is taken as a reference, the slope of the other plane is oriented in the reverse direction.

3. An optical film according to claim 1, wherein the optical-path changing slopes are tilted at an angle of 38 through 45 degrees.

4. An optical film according to claim 1, wherein the cross sections of the groove structures assume substantially the shape of a triangle, or the shape of a trapezoid.

5. An optical film according to claim 1, wherein the groove structures are made of grooves whose lengths are five times or more the depths thereof and which have optical-path changing slopes in the lengthwise direction of the groove structures.

6. An optical film according to claim 1, wherein ridge lines of the optical-path changing slopes are parallel with one side of the transparent film or tilted at an angle of ±30° or less relative to the same.

7. An optical film according to claim 1, wherein the adhesive layer is of optical diffusion type.

8. An optical film comprising:

a transparent film;

an adhesive layer provided on one side of said transparent film;

a layer including a plurality of groove structures, each structure having optical-path changing slopes oriented substantially toward certain directions at an angle of 35 to 48 degrees relative to the transparent film, and said layer being laid on the other side of said transparent film;

a transparent cover film for covering the surface of the layer in which the groove structures are formed; and at least an anti-reflection layer and an anti-moisture layer laid on an exterior side of the cover film, wherein an antiglare layer is interposed between the cover film and the anti-reflection layer, and the adhesive layer is covered with a release liner, wherein the transparent cover film covers the surface of the layer in which the groove structures are formed without directly covering surfaces of the grooves.

9. An optical film comprising:

a transparent film;

an adhesive layer provided on one side of said transparent film;

a layer including a plurality of groove structures, each structure having optical-path changing slopes oriented substantially toward certain directions at an angle of 35 to 48 degrees relative to the transparent film, and said layer being laid on the other side of said transparent film;

a transparent cover film for covering the surface of the layer in which the groove structures are formed; and at least an anti-reflection layer and an anti-moisture layer laid on an exterior side of the cover film, wherein areas on one surface of the optical film are occupied by flat planes which are inclined at an angle of less than five degrees relative to the surface of the optical film and are at least five times longer than areas occupied by slopes inclined at an angle of 35 degrees or more.

* * * * *